Nov. 25, 1952 W. L. MORRISON, JR 2,619,331
MAGNETIC POWER UNIT LOCK
Filed Sept. 21, 1949
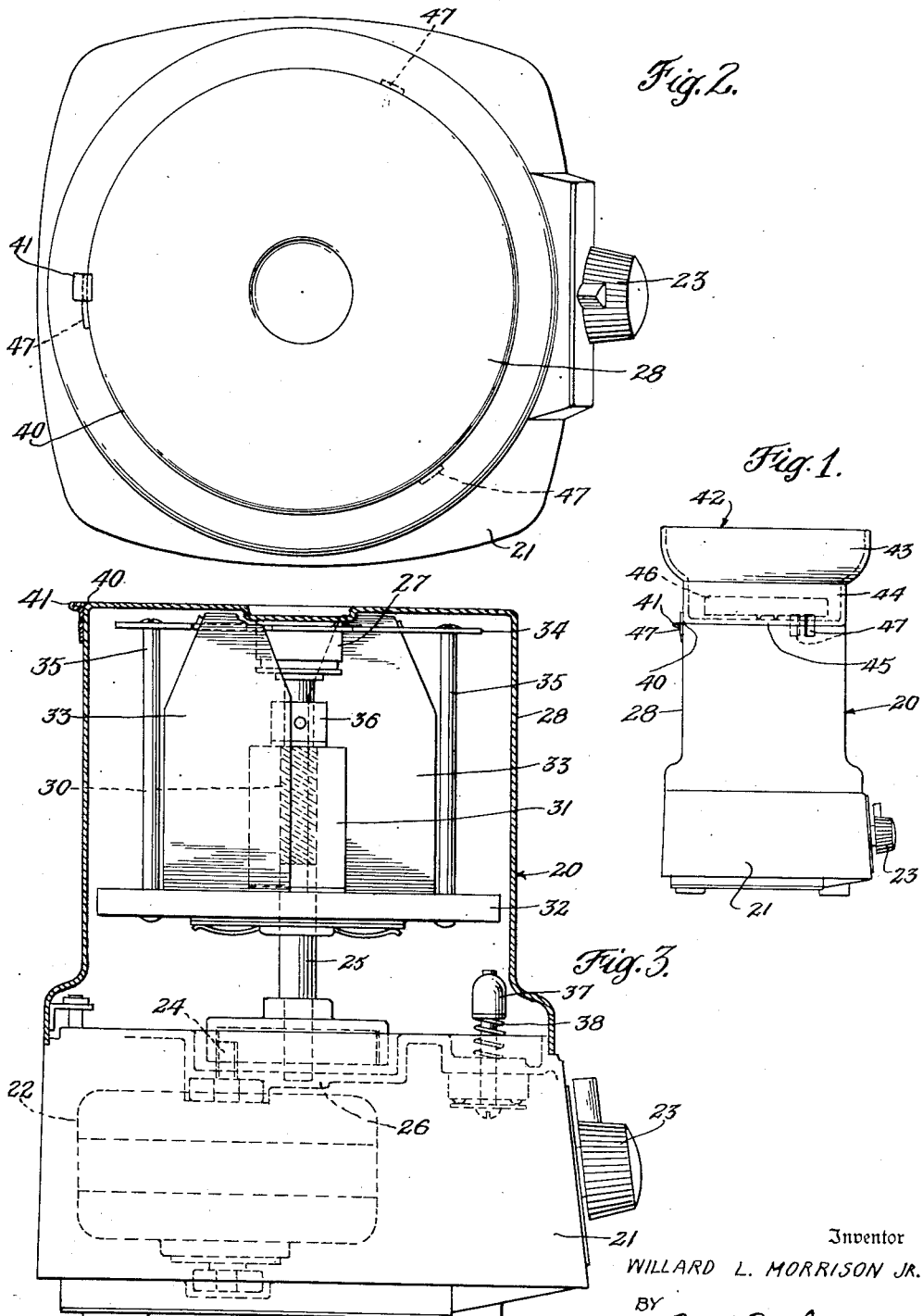
Inventor
WILLARD L. MORRISON JR.
BY
Attorneys Patented Nov. 25, 1952

2,619,331

UNITED STATES PATENT OFFICE 2,619,331

MAGNETIC POWER UNIT LOCK

Willard L. Morrison, Jr., Akron, Ohio, assignor to Magnetic Power, Inc., Wilmington, Del., a corporation of Delaware Application September 21, 1949, Serial No. 116,911

2 Claims. (Cl. 259—108)

The present invention relates to magnetic mixers and the like and to power units therefor, especially of the type which are used in mixing, stirring, homogenizing and juicing in the kitchen.

A purpose of the invention is to hold a mixing vessel such as a bowl against turning while a magnetic keeper is operating in the vessel under the action of a remotely located turning magnet.

A further purpose is to maintain a mixing vessel centrally located and at the same time keep it from turning.

A further purpose is to hold a mixing vessel down against the housing of a magnetic power unit by the pull on a keeper in the vessel and at the same time prevent the vessel from turning by engagement by a lug on the vessel with a lug on the housing of the power unit.

A further purpose is to exert magnetic force on a keeper to hold a mixing vessel in place on the housing of a magnetic power unit and maintain the vessel central by lugs engaging the rim of the casing, while preventing rotation by a cooperating lock on the rim of the casing.

Further purposes appear in the specification and in the claims.

In the drawings I have chosen to illustrate one only of the numerous embodiments in which my invention may appear, selecting the form shown from the standpoints of convenience in illustration, satisfactory operation and clear demonstration of the principles involved.

Figure 1 is a side elevation of a magnetic power unit and mixing bowl conforming to the invention.

Figure 2 is a top plan view of the device of Figure 1 with the mixing bowl removed.

Figure 3 is a side elevation of Figure 2 partly in central vertical section.

In the drawings like numerals refer to like parts.

Magnetic power units for stirring, mixing, homogenizing and juicing in the kitchen have been successfully developed, an example of the same being embodied in Jerome L. Murray U. S. patent application Serial No. 771,176, filed August 29, 1947, for Mixer and Processor for Home Use and the Like. In these devices a magnet is turned on a shaft, and a remotely located keeper turns with the magnet under the influence of magnetic force and exerts the stirring or other action on the work.

In such prior art devices, as the torque has been necessarily increased to meet severe service conditions such as mixing of thick batters, and doughs, the tendency of the bowl or other vessel to turn with the magnetically susceptible keeper and thus prevent shear between the keeper and the vessel has increased, since torque is transmitted from the keeper through the batter or dough to the wall of the bowl. Therefore, mixing cannot be effectively obtained without holding the bowl.

In accordance with the present invention, the magnetic force on the keeper is used to hold the vessel down on the housing of the power unit and prevent displacement, while lugs or other interlocks are provided between the vessel and the housing to prevent turning of the vessel and also to maintain the vessel in central position.

In the preferred embodiment, the housing surrounds the magnet and provides a generally flat and circular upper surface on which the vessel at suitably circumferentially spaced points extend over the rim of the housing and a cooperating lug at the rim of the housing extends into engagement with one of the lugs on the vessel. In this form the magnetic pull on the keeper holds down the vessel and prevents it from riding up and permitting lateral displacement, while the lugs on the vessel maintain the vessel centrally with respect to the housing of the power unit and one of the lugs on the vessel by engagement with the lug on the power unit stops rotation.

It thus becomes unnecessary to grip the vessel against rotation and it is also unnecessary to provide any other means of clamping the vessel.

When a mixer is equipped with the interlocking lugs according to the invention, the clamping action is so firm and effective that it is possible to invert the power unit and the vessel without having any displacement occur. The magnetic pull on the keeper clamps the bowl or other vessel against the housing, regardless of the position in which the parts may be, unless the weight of the bowl is excessive.

In accordance with the invention, the magnetic power unit 20 consists of a lower housing 21 containing an electric motor 22 on a vertical axis, controlled by a switch 23, intergeared at 24 with a vertical rotor shaft 25 supported in bearing 26 at the bottom and 27 at the top. The bearing 27 is mounted at the center of the top of a suitably non-magnetic casing 28 joined to the lower housing.

The rotor shaft 25 has threads 30 which loosely engage a surrounding nut 31 which is suitably interconnected with a rotor base 32. The rotor base mounts upwardly extending magnets 33 which are held at the top on the rotor by a non-magnetic rotor plate 34 joined to the rotor base by studs 35. The plate 34 is recessed at the center to clear the top bearing 27. Upward travel of the rotor on the shaft is limited by a collar 36 and downward travel is limited by a cut-off switch 37 having an upwardly acting compression spring 38.

The housing 28 has at its outer edge 40 an outwardly extending lug 41. A bowl 42 rests on the power unit and has an outwardly curved upper portion 43 and a cylindrical lower portion 44 terminating in a flat bottom on which rests a magnetically susceptible keeper 46 which turns with and under the influence of the action of the magnets.

The cylindrical lower portion 44 of the bowl has at its lower outer edge a plurality of preferably equally circumferentially placed lugs 47 which extend downwardly over the top edge of the housing of the power unit. There are preferably three such lugs, one of which engages against the lug 41 on the casing as best seen in Figure 2.

Thus the pull of the magnets on the keeper 46 tends to hold the bowl down while the lugs 47 prevent the bowl from being displaced sideways and the engagement of one of the lugs 47 with the lug 41 on the casing prevents the bowl from rotating.

The bowl or other vessel may be made of any suitable non-magnetic material such as glass, plastic or non-magnetic metal but will preferably be of non-magnetic metal although the device is operative where very thin layers of magnetic metal are used as in the case of enameled steel.

In operation it will be evident that in preparing to use the device, the bowl or other vessel is placed on the housing of the power unit with the lugs on the bowl engaging around the rim of the housing. The material to be mixed or otherwise acted upon is placed in the vessel, and a magnetic keeper in the form of a stirrer, impeller or the like is also placed in the vessel. The motor of the power unit is then started, causing the magnet to turn. In some forms of the device, as that of the Murray application above referred to, the magnet moves to a position in proximity with the keeper as the motor starts. After the mixing or other turning cycle is completed, the motor will preferably be turned off. The vessel and keeper can be removed from the power unit by pulling against the magnetic force, or, in some forms of the device, as that embodied in Morrison et al. U. S. application Serial No. 118,305, filed September 28, 1949, for Magnetic Power Unit Reversing Drive, the magnet is automatically moved to a remote position at the end of the cycle, so that the vessel and keeper can be removed more readily.

It will be evident that the lugs serve to hold the vessel in place even when the magnetic power unit is not operating.

While reference has been made herein to a permanent magnet or magnets supported on a rotor for creating the turning magnetic field, questions of whether the magnetic driving field is created by a permanent magnet, an electromagnet or some combination of the same, or by magnets on a rotor or a magnet which forms the entire rotor are not critical in the present invention, and it will be understood that variations in these features may be employed if desired.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. In a magnetic power unit, a rotatably driven magnet, a housing surrounding the magnet and having a generally circular upper surface, a vessel, circular in cross section, resting on the housing, lugs on the vessel extending around and engaging the rim of the housing, a lug at the rim of the housing adapted to engage one of the lugs on the vessel and a keeper in the vessel turned by the magnet and pulled toward the magnet, holding the lugs on the vessel in position around the rim of the housing.

2. In a magnetic power unit, a rotatably driven magnet, a housing surrounding the magnet and having a generally circular upper surface, a vessel, circular in cross section, resting on the housing, three equally circumferentially spaced lugs on the vessel extending around and engaging the rim of the housing, a lug at the rim of the housing adapted to engage one of the lugs on the vessel and a keeper in the vessel turned by the magnet and pulled toward the magnet, holding the vessel in position.

WILLARD L. MORRISON, Jr.

REFERENCES CITED

The following references are of record in the file of this patent:

UNITED STATES PATENTS

| Number | Name | Date |
|---|---|---|
| 2,109,501 | Osius | Mar. 1, 1938 |
| 2,282,866 | Hagen | May 12, 1942 |
| 2,350,534 | Rosinger | June 6, 1944 |
| 2,459,224 | Hendricks | Jan. 18, 1949 |
| 2,466,468 | Neal | Apr. 5, 1949 |